HAROLD D. HARRIS
INVENTOR.

HAROLD D. HARRIS
INVENTOR.

Dec. 12, 1967  H. D. HARRIS  3,357,500
HARROW HITCH
Filed May 7, 1965
3 Sheets-Sheet 3
FIG. 5
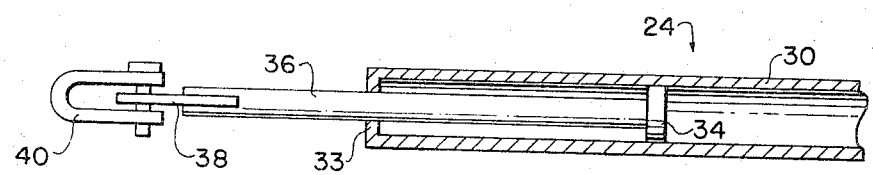
FIG. 4
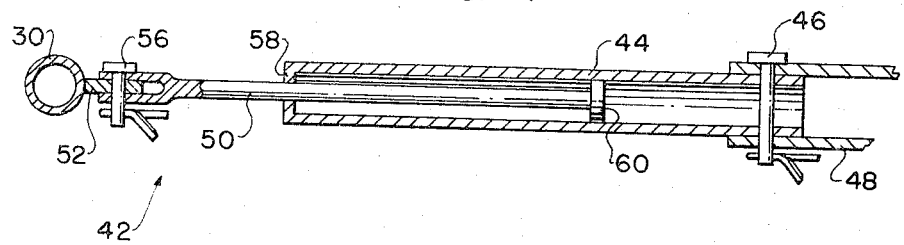
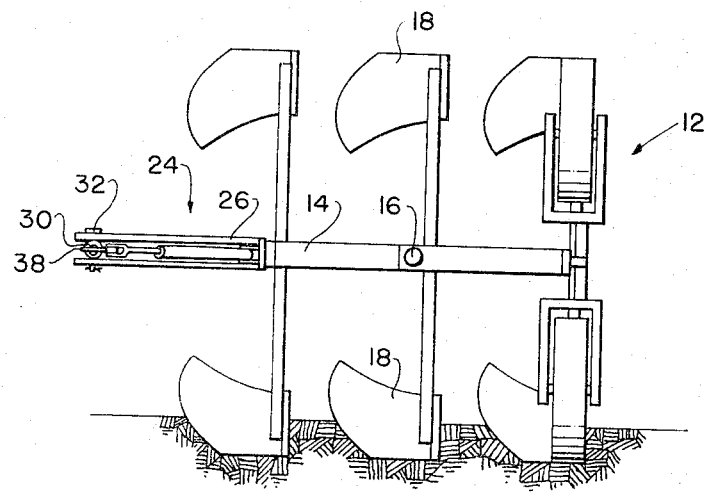
FIG. 3
HAROLD D. HARRIS
INVENTOR.
BY
Atty.

United States Patent Office 3,357,500
Patented Dec. 12, 1967

3,357,500
HARROW HITCH
Harold David Harris, 701 N. Avenue N,
Lubbock, Tex. 79403
Filed May 7, 1965, Ser. No. 453,984
5 Claims. (Cl. 172—161)

ABSTRACT OF THE DISCLOSURE

A hitch, for attaching a harrow to a two way moldboard plow, has a telescoping element for ease in attaching the implements together. Also the horizontal travel of the hitch is limited by an extension element to prevent tangling of the equipment when turning.

---

This invention relates to agricultural implements and more particularly to a hitch for attaching a harrow to a two way moldboard plow.

In breaking land two way moldboard plows which have two sets of bottoms on a frame which rotate about a horizontal axis in the direction of draft are in common commercial use. Often it is desirable to drag a harrow behind these plows to cultivate the soil behind them. Inasmuch as the plows throw the dirt to one side it is not desirable to drag the harrow behind the axis about which the plow rotates when turning from one set of bottoms to the other but it is desirable to have it trail from one side of the plow.

The dragging of the harrow behind such a plow is difficult inasmuch as when the plow is turned at the end of a row the lefting of the plow, the rotating of the frame, and the turning of the tractor cause the harrow to flop about and perform unsatisfactorily.

An object of this invention is to provide a hitch to drag a harrow behind a two way plow.

Still further objects are to achieve the above with a device that is sturdy, compact, durable, simple, versatile, and reliable, yet inexpensive and easy to manufacture and operate.

The specific nature of the invention as well as other objects, uses and advantages thereof will clearly appear from the following description and from the accompanying drawing, the different views of which are not necessarily to the same scale, in which:

FIG. 3 is a rear view of the plow with the hitch but not the harrow for clarity.

FIG. 4 is a sectional view of a portion of the hitch taken on line 4—4 of FIG. 1.

FIG. 5 is a sectional view of a portion of the hitch taken on line 5—5 of FIG. 1.

Figure 1:
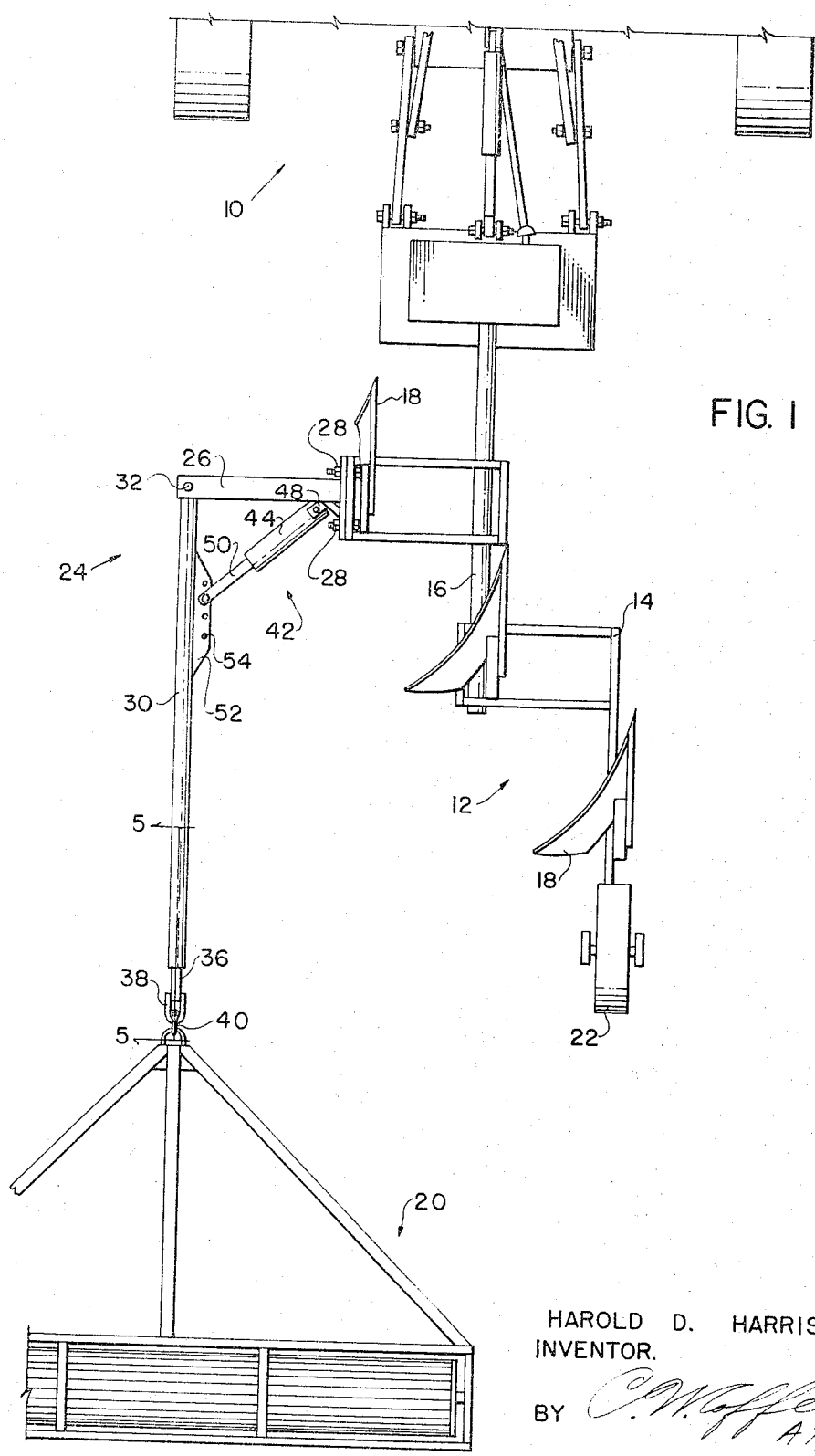
FIG. 1 is a plan view of a plow and harrow, partially schematic and partially broken away connected with the hitch according to this invention.
Figure 2:
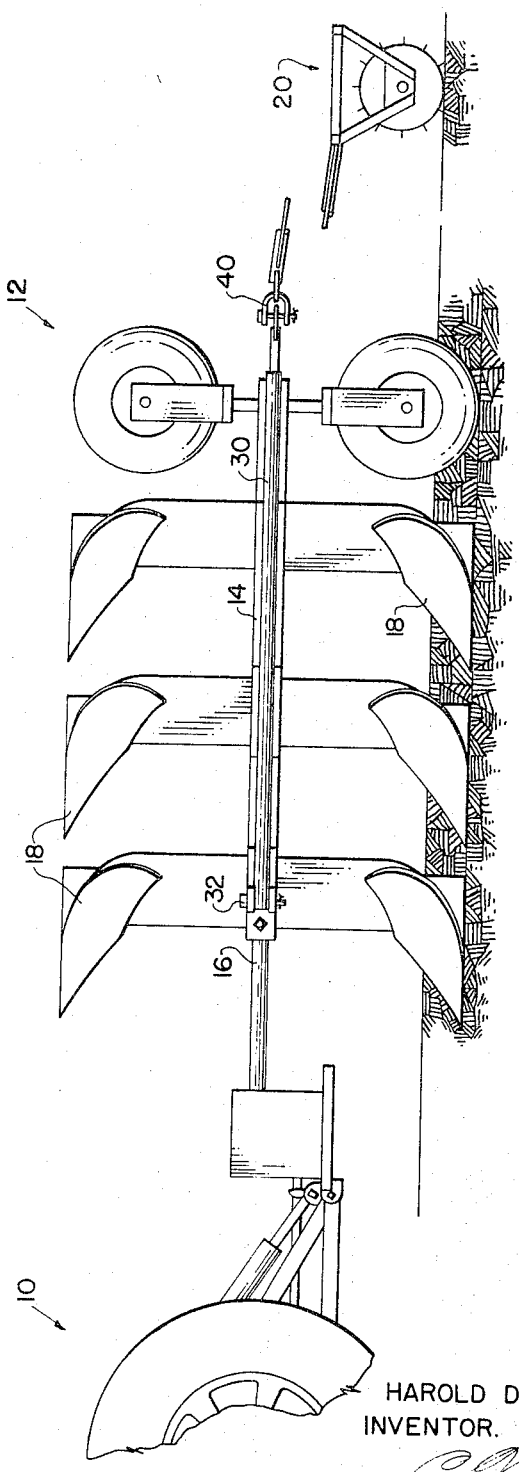
FIG. 2 is a side elevational view partially broken of a plow and a harrow connected by a hitch according to this invention.

Referring more particularly to the drawings, it may be seen there represented a portion of the tractor 10 which operates as a draft vehicle to pull the plow 12 and support same. The plow 12 has a frame 14 which is supported about a tube 16 which forms a horizontal axis in the direction of draft for rotating the frame 14 thereabout. Two sets of moldboard bottoms 18 are attached to the frame 14. Mechanism innerconnects the plow 12 and the tractor 10 for raising and lowering the plow and rotating it about the horizontal axis defined by the tube 16. Inasmuch as the two way plows as described above are conventional and commercially available upon the market and they are not discussed further herewith.

Often it is desirable to drag auxiliary equipment such as harrow 20 behind the plow 12. Various auxiliary equipment other than a harrow may be used and a packer-mulcher type rotating harrow has been illustrated herewith. The plow 12 throws the dirt to one side and leaves a furrow at the side having wheel 22. It is necessary for proper operation that the harrow 20 be attached to pull to one side of the axis as defined by the tube 16.

Hitch 24 includes cantilever 26 which is bolted by bolts 28 to one side of the frame 14 opposite that which the wheel 22 is attached. Inasmuch as the frame is irregular the point of attachments by the bolt 28 to the frame 14 will be well forward along the frame 14. Rigid tension tube 30 is pivoted about a vertical axis by pin 32 to the other end of cantilever 26 than that which is bolted to the frame. The end of the tension tube 30 has an inwardly extending flange 33 which acts as a stop in connection with protrusion 34 on the end of tension rod 36 which is telescoped within the end of the tension tube 30 (FIG. 5). The end of the tension rod 36 has loop 38 welded thereto by which the harrow 20 is attached by a conventional clevis 40. Having the tension rod 36 telescoped and pivoted within the tension tube 30 allows for the rotation of the tube with respect to the rod. Also when attaching the harrow 20 to the plow 12 the telescoping permits sufficient movement to ease the task.

The movement of the tension tube 30 about the pivot of the bolt 32 is limited by extension means 42. The extension means 42 includes extension tube 44 which is pivoted about a vertical axis by pin 46 which extends between two ears 48 attached to the cantilever 26 adjacent to the point of bolting the cantilever 26 to the frame 14. Extension rod 50 is telescoped within the tube 44. Plate 52 is welded to the one side of the tube 30 and has a plurality of holes 54 therein. The rod 50 is pivoted to the tube 30 by pin 56 extending through a hole in the end of the rod 50 and one of the holes in the plate 52. The adjustment is provided by the selection of the particular hole 54 and the plate wherein the pin 56 is placed. Extension tube 44 has an internal flange 58 at the end thereof which together with protrusion 60 on the end of the rod 50 forms stop means for limiting the travel of the rod and the tube. This forms means for limiting the outward travel of the rod 50 in the tube 44. The rod 50 is limited in its inward movement by the contact of the protrusion 60 upon the pin 46.

If the hitch 24 is considered permanently attached to the plow 12 then the cantilever 26 is part of the frame 14 and the tubes 30 and 44 are pivoted to the frame.

It will be apparent that the embodiment shown is only exemplary and that various modifications can be made in construction, materials, and arrangement within the scope of the invention as defined in the appended claims.

I claim as my invention:
1. An improved hitch for use in combination with
   (a) a plow having
   (b) two sets of bottoms
   (c) mounted on a frame,
   (d) said frame mounted for rotation about
   (e) a horizontal axis aligned with the direction of draft, and
   (f) an auxiliary implement to drag behind the plow; said improved hitch in combination with the above comprising:
   (g) a rigid elongated tension element pivoted
   (h) about a vertical axis when it is in the plowing position at
   (j) one side of the frame,
   (k) an extension means between the frame and tension element for limiting the movement of the tension element each way about its pivot, and
   (m) a telescoped, rotatable tension rod in

(n) the end of the tension element
(p) attached to the auxiliary equipment.

2. An improved hitch for use in combination with
(a) a plow having
(b) two sets of bottoms
(c) mounted on a frame,
(d) said frame mounted for rotation about
(e) a horizontal axis aligned with the direction of draft, and
(f) an auxiliary implement to drag behind the plow; said improved hitch in combination with the above comprising:
(g) a horizontal cantilever
(h) rigidly attached at one end to the plow,
(j) a rigid elongated tension element pivoted
(k) about a vertical axis when the plow is in a plowing position to
(m) the other end of the cantilever,
(n) an extension means between the cantilever and tension element for limiting the movement of the tension element each way about its pivot, and
(o) a telescoped, rotatable tension rod in
(p) the end of the tension element
(q) attached to the auxiliary implement.

3. The invention as defined in claim 2 wherein
(r) the attachment of the extension means to the tension element is adjustable to the tension element along the length of the tension element.

4. An improved hitch for use in combination with
(a) a plow having
(b) two sets of bottoms
(c) mounted on a frame,
(d) said frame mounted for rotation about
(e) a horizontal axis aligned with the direction of draft, and
(f) an auxiliary implement to drag behind the plow; said improved hitch in combination with the above comprising:
(g) a horizontal cantilever
(h) bolted at one end of the plow,
(j) a rigid tension tube pivoted
(k) about a vertical axis to the
(m) other end of the cantilever,
(n) an extension tube pivoted about a vertical axis to the cantilever,
(o) an extension rod pivoted about a vertical axis to the tension tube,
(p) said extension rod telescoped in the extension tube,
(q) stop means on the extension rod and tube for limiting the travel of the extension rod in either direction in the extension tube,
(r) a tension rod
(s) telescoped, rotatably in the end of the tension tube, and
(t) stop means on the tension rod and tube for limiting the outward travel of the rod in the tube,
(u) said tension rod attached to said auxilary implement.

5. The invention as defined in claim 4 with the addition of
(v) a plate welded to the tension tube,
(w) a plurality of holes in the plate, and
(x) a pin extending through the extension rod and a hole in the plate forming said pivot therebetween.

References Cited

UNITED STATES PATENTS 3,232,354   2/1966   Schlabs _____ 172—162

ABRAHAM G. STONE, *Primary Examiner.*

J. R. OAKS, *Assistant Examiner.*